United States Patent
Kim et al.

(10) Patent No.: US 11,941,289 B2
(45) Date of Patent: Mar. 26, 2024

(54) APPARATUS AND METHOD FOR CHECKING AN ERROR OF A NON-VOLATILE MEMORY DEVICE IN A MEMORY SYSTEM

(71) Applicant: SK hynix Inc., Gyeonggi-do (KR)

(72) Inventors: Jung Ae Kim, Gyeonggi-do (KR); Jee Yul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 44 days.

(21) Appl. No.: 17/204,036

(22) Filed: Mar. 17, 2021

(65) Prior Publication Data
US 2022/0113908 A1  Apr. 14, 2022

(30) Foreign Application Priority Data
Oct. 14, 2020  (KR) .................. 10-2020-0132607

(51) Int. Cl.
*G06F 3/06* (2006.01)
*G06F 12/0882* (2016.01)

(52) U.S. Cl.
CPC .......... *G06F 3/0659* (2013.01); *G06F 3/0619* (2013.01); *G06F 3/0653* (2013.01); *G06F 3/0679* (2013.01); *G06F 12/0882* (2013.01); *G06F 2212/7201* (2013.01)

(58) Field of Classification Search
CPC ............. G06F 12/0246; G06F 12/0238; G06F 11/1048; G06F 11/1441; G06F 3/0679; G06F 3/0619; G06F 3/0655; G06F 3/064; G06F 3/0673; G06F 3/0614; G06F 2212/7205; G06F 2212/1032; G06F 2212/2022; G06F 2212/7209; G06F 2212/7201; G06F 11/1471; G06F 11/1402; G06F 11/1474; G06F 11/1458; G06F 11/1461; G06F 11/1464; G06F 11/1466; G06F 11/1469; G06F 11/0766; G06F 11/0769; G06F 11/0722; G06F 11/0775; G06F 11/0778; G06F 11/0781; G06F 11/0784; G06F 11/0787; G06F 11/0793; G06F 11/0751; G11C 16/3459; G11C 16/105
See application file for complete search history.

(56) References Cited

U.S. PATENT DOCUMENTS

| | | | |
|---|---|---|---|
| 8,452,929 B2 | 5/2013 | Bennett | |
| 9,921,956 B2 | 3/2018 | Thomas et al. | |
| 10,120,792 B1* | 11/2018 | Segal | G06F 3/061 |
| 2018/0181346 A1* | 6/2018 | Kim | G06F 12/0246 |
| 2018/0275887 A1* | 9/2018 | Yang | G06F 12/1009 |
| 2018/0357165 A1 | 12/2018 | Helmick et al. | |
| 2020/0104261 A1* | 4/2020 | Oh | G06F 9/467 |

* cited by examiner

*Primary Examiner* — Curtis James Kortman
(74) *Attorney, Agent, or Firm* — IP & T GROUP LLP

(57) ABSTRACT

A memory system includes a memory device including plural memory groups, each memory group including plural non-volatile memory cells; and a controller configured to transmit a command to the memory device so that the memory device performs a data input/output operation within at least one memory group among the plural memory groups, receive a response for the command and a status data regarding the at least one memory group from the memory device, and determine whether the data input/output operation has succeeded or failed based on the response and the status data.

17 Claims, 5 Drawing Sheets

APPARATUS AND METHOD FOR CHECKING AN ERROR OF A NON-VOLATILE MEMORY DEVICE IN A MEMORY SYSTEM

CROSS-REFERENCE TO RELATED APPLICATIONS

This patent application claims the benefit of Korean Patent Application No. 10-2020-0132607, filed on Oct. 14, 2020, the entire disclosure of which is incorporated herein by reference.

TECHNICAL FIELD

One or more embodiments described herein relate to a memory system, and an apparatus and a method which check an error occurring in a non-volatile memory device.

BACKGROUND

Recently, a paradigm for a computing environment has shifted to ubiquitous computing, which enables computer systems to be accessed virtually anytime and anywhere. As a result, the use of portable electronic devices (e.g., mobile phones, digital cameras, notebook computers) is rapidly increasing. Such portable electronic devices may use or include a memory system having at least one memory device, e.g., a data storage device. The data storage device can be used as a main storage device or an auxiliary storage device of a portable electronic device.

Unlike a hard disk, data storage devices that use non-volatile semiconductor memories exhibit improved stability and durability, have no mechanical driving parts (e.g., a mechanical arm), and perform with high data access speeds and relatively low power consumption. Examples of these types of data storage devices include, but are not limited to, Universal Serial Bus (USB) memory devices, memory cards having various interfaces, and solid state drives (SSDs).

BRIEF DESCRIPTION OF THE DRAWINGS

The description herein makes reference to the accompanying drawings wherein like reference numerals refer to like parts throughout the figures.

DETAILED DESCRIPTION

Figure 1:
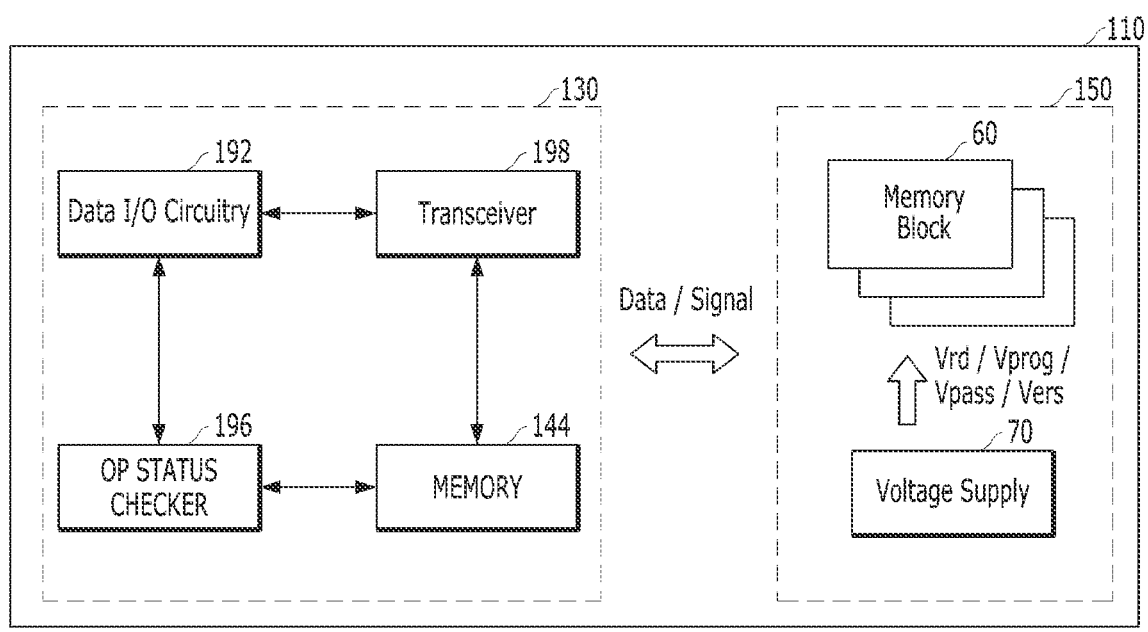
FIG. 1 illustrates a memory system according to an embodiment of the present disclosure.

Various embodiments of the present disclosure are described below with reference to the accompanying drawings. Elements and features of the disclosure, however, may be configured or arranged differently to form other embodiments, which may be variations of any of the disclosed embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware for example, circuits, memory storing program instructions executable to implement the operation, etc. Additionally, "configured to" can include a generic structure (e.g., generic circuitry) that is manipulated by software and/or firmware (e.g., a field programmable gate array (FPGA) or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' may refer to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data or a data item may be a sequence of bits. For example, the data item may include the contents of a file, a portion of the file, a page in memory, an object in an object-oriented program, a digital message, a digital scanned image, a part of a video or audio signal, or any other entity which can be represented by a sequence of bits. According to an embodiment, the data item may include a discrete object. According to another embodiment, the data item may include a unit of information within a transmission packet between two different components.

An embodiment of the disclosure can provide a data processing system and a method for operating the data processing system, which includes components and resources such as a memory system and a host, and is capable of dynamically allocating plural data paths used for data communication between the components based on usages of the components and the resources.

In addition, if a memory device informs a controller of operation success even when a corresponding operation performed within the memory device including a non-volatile memory cell is not successfully completed or an error occurs during the operation, a memory system according to an embodiment of the disclosure can detect the error, abnormal operation or operation failure occurring within the memory device.

In the memory system according to an embodiment of the disclosure, the controller can be configured to transmit a command for a data input/output operation to a memory device including a non-volatile memory cell and receives a result of the data input/output operation from the memory device. Further, the controller can include a device capable of improving reliability of the data input/output operation. The device can receive information on a memory block or page related to the data input/output operation in the device and compare the result of the data input/output operation and the information to perform a double check regarding the data input/output operation.

In addition, the memory system according to an embodiment of the disclosure can re-confirm the result of data input/output operation based on separate information even if an error occurs in a transmitted result of a data input/output operation performed by the memory device due to a malfunction of the memory device including a non-volatile memory cell.

In an embodiment of the present disclosure, a memory system can include a memory device including plural memory groups, each memory group including plural non-volatile memory cells; and a controller configured to transmit a command to the memory device so that the memory device performs a data input/output operation within at least one memory group among the plural memory groups, receive a response for the command and a status data regarding the at least one memory group from the memory device, and determine whether the data input/output operation has succeeded or failed based on the response and the status data.

The controller can determine whether the data input/output operation has succeeded or failed by comparing the status data with a physical to logical (P2L) map data item associated with the data input/output operation. The controller can be further configured to update a logical to physical (L2P) map data item based on the P2L map data according to whether the data input/output operation has succeeded.

The controller can determine whether the data input/output operation has succeeded or failed by assigning a higher priority to a first determination of success or failure based on the status data than a second determination of success or failure based on the response, when the first determination and the second determination have different outcomes.

For example, each memory group among the plural memory groups can be a page. The status data can include bitmap information indicating whether the page is blank or empty.

For another example, each memory group among the plural memory groups can be a memory block, and the status data includes a page count indicating how many pages of the memory block data items are stored in.

The memory device can be configured to transmit the response to the controller immediately after the data input/output operation corresponding to the command is completed. The memory device can be configured to transmit the state data to the controller when metadata is updated by the data input/output operation.

The data input/output operation can include data program, data erase or data read onto the plural memory groups. The memory device can be further configured to update the status data associated with the data program, the data erase or the data read.

In another embodiment of the present disclosure, a method for operating a memory system can include performing a data input/output operation within at least one memory group in a memory device including plural memory groups, each memory group including plural non-volatile memory cells; receiving a response from the memory device, the response including a result of the data input/output operation; receiving a status data regarding the at least one memory group from the memory device; and determining whether the data input/output operation has succeeded or failed based on the response and the status data.

The determining whether the data input/output operation has succeeded or failed can include comparing the status data with a physical to logical (P2L) map data item associated with the data input/output operation. The method can further include updating a logical to physical (L2P) map data item based on the P2L map data according to whether the data input/output operation has succeeded.

The determining whether the data input/output operation has succeeded or failed can include assigning a higher priority to a first determination of success or failure based on the status data than a second determination of success or failure based on the response, when the first determination and the second determination have different outcomes.

For example, each memory group among the plural memory groups can be a page. The status data can include bitmap information indicating whether the page is blank or empty.

For another example, each memory group among the plural memory groups can be a memory block. The status data can include a page count indicating how many pages data items of the memory block are stored in.

The method can further include transmitting, by the memory device, the response immediately after the data input/output operation corresponding to the command is completed, and transmitting, by the memory device, the state data when metadata is updated by the data input/output operation.

The data input/output operation can include data program, data erase or data read onto the plural memory groups. The method can further include updating the status data associated with the data program, the data erase or the data read.

In another embodiment of the present disclosure, a controller can be coupled via at least one data path to a memory device including plural memory groups, each memory group including plural non-volatile memory cells. The controller can include at least one processor and at least one memory including computer program code, wherein the at least one memory and the computer program code are configured, with the at least one processor, to cause the controller to perform a data input/output operation within at least one memory group in the memory device; receive a response from the memory device, the response including a result of the data input/output operation; receive a status data regarding the at least one memory group from the memory device; and determine whether the data input/output operation has succeeded or failed based on the response and the status data.

The at least one memory and the computer program code are configured, with the at least one processor, to cause the controller to determine whether the data input/output operation has succeeded or failed by comparing the status data with a physical to logical (P2L) map data item associated with the data input/output operation. The at least one memory and the computer program code can be further configured, with the at least one processor, to cause the controller to update a logical to physical (L2P) map data item based on the P2L map data according to whether the data input/output operation has succeeded.

The at least one memory and the computer program code are configured, with the at least one processor, to cause the controller to determine whether the data input/output operation has succeeded or failed by assigning a higher priority to a first determination of success or failure based on the status data than a second determination of success or failure based on the response, when the first determination and the second determination have different outcomes.

For example, each memory group among the plural memory groups can be a page. The status data can include bitmap information indicating whether the page is empty or blank.

For another example, each memory group among the plural memory groups can be a memory block. The status data can include a page count indicating how many pages of the memory block data items are stored in.

The at least one memory and the computer program code are further configured, with the at least one processor, to cause the controller to receive the response from the memory device immediately after the data input/output operation corresponding to the command is completed, and receive the status data from the memory device when metadata is updated by the data input/output operation.

In another embodiment of the present disclosure, a memory system can include a memory device configured to perform an access operation of storing data into a non-volatile storage unit or erasing the data from the storage unit and providing a response indicating that the data is successfully stored or erased, in response to a command; and a controller configured to: provide the command to the memory device, reflect the response into physical-to-logical (P2L) map data, control the memory device to generate information regarding the data stored in the storage unit, control, when the P2L map data is different from the information, the memory device to perform the access operation again, and reflect, when the P2L map data is the same as the information, the response into logical-to-physical (L2P) map data.

Embodiments of the present disclosure will now be described with reference to the accompanying drawings, wherein like numbers reference like elements.

FIG. 1 illustrates a data processing system according to an embodiment of the present disclosure.

Referring to FIG. 1, a memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 1, the memory device 150 may include a plurality of memory blocks 60. The memory block 60 may be understood as a group of non-volatile memory cells in which data is removed together by a single erase operation. Although not illustrated, the memory block 60 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange a piece of data and a signal with the controller 130.

According to an embodiment, the memory device 150 may include at least one memory block 60, at least one memory plane, or at least one memory die. The internal configuration of the memory device 150 shown in FIG. 1 may be different according to performance of the memory system 110. An embodiment of the present disclosure is not limited to the internal configuration shown in FIG. 1.

Referring to FIG. 1, the memory device 150 may include a voltage supply circuit capable of supplying at least some voltage into the memory block. The voltage supply circuit may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block, the voltage supply circuit may supply the read voltage Vrd into a selected non-volatile memory cell. During the program operation for storing data in the non-volatile memory cell included in the memory block, the voltage supply circuit may supply the program voltage Vprog into a selected non-volatile memory cell. Also, during a read operation or a program operation performed on the selected nonvolatile memory cell, the voltage supply circuit may supply a pass voltage Vpass into a non-selected nonvolatile memory cell. During the erasing operation for erasing data stored in the non-volatile memory cell included in the memory block, the voltage supply circuit may supply the erase voltage Vers into the memory block.

The memory device 150 may store information regarding various voltages which are supplied to the memory block 60 based on which operation is performed. For example, when a non-volatile memory cell in the memory block can store multi-bit data, plural levels of the read voltage Vrd for recognizing or reading the multi-bit data may be required. The memory device 150 may include a table including information corresponding to plural levels of the read voltage Vrd, corresponding to the multi-bit data. For example, the table can include bias values stored in a register, each bias value corresponding to a specific level of the read voltage Vrd. The number of bias values for the read voltage Vrd that is used for a read operation may be limited to a preset range. Also, the bias values can be quantized.

In response to a request input from the external device, the controller 130 may perform a data input/output operation. For example, when the controller 130 performs a read operation corresponding to a read request input from the external device, data stored in a plurality of non-volatile memory cells included in the memory device 150 may be transferred to the controller 130. For the read operation, the input/output (I/O) controller 192 may transmit a read command to the memory device 150 through a transceiver 198. The transceiver 198 may transmit the read command to the memory device 150 and receive data output from the memory device 150. The transceiver 198 may store the data output from the memory device 150 in the memory 144. The input/output (I/O) controller 192 may output the data stored in the memory 144 to the external device, as a response of the read request.

In addition, the input/output controller 192 may transmit data, input along with a write request from the external device, to the memory device 150 through the transceiver 198. After storing the data in the memory device 150, the input/output controller 192 may transmit to the external device a response of the write request, which shows that the data is successfully programmed.

In general, when a malfunction does not occur in processes of either internal operations performed within the memory device 150 or data communication (e.g., transmission/reception of data, commands, responses, etc.) between the controller 130 and the memory device 150, the controller 130 may be configured to determine whether a data input/output operation has succeeded or failed based on a response provided from the memory device 150 regarding the data input/output operation. However, when the memory device 150 transmits an incorrect response to the controller 130 due to the malfunction or the error occurs in the data communication between the controller 130 and the memory device 150, success or failure of the data input/output operation performed within the memory device 150 might be different from success or failure of the data input/output operation recognized by the controller 130. In this case, operation reliability of the memory system 110 may be degraded.

According to an embodiment, an operation status checker 196 in the controller 130 can collect status data regarding the memory block 60 or the page associated with the data input/output operation performed within the memory device 150 and perform a double check of whether the data input/output operation has succeeded or failed based on the status data. As described above, the memory device 150 may include a plurality of memory groups, each memory group including a plurality of non-volatile memory cells. Here, the memory group may correspond to various structural components such as the memory block 60, a page, a plane, a die, a super block, and the like which may be associated with the data input/output operation or a type of operation performed within the memory device 150. For example, when a read or program operation is performed on a page-by-page basis, the memory group may be understood as the page. When an erase operation is performed on a block-by-block basis, the memory group may be the memory block 60.

After performing a data input/output operation in response to a command transmitted from the controller 130, the memory device 150 transmits operation information related to the data input/output operation such as status data or a changed map data item associated with a data item in response to another command of the controller 130. Apart from the response which is already transmitted after the data input/output operation, the operation status checker 196 may determine whether the data input/output operation is successful based on the operation information which is transmitted from the memory device 150. According to an embodiment, the operation information can be transmitted along with the response regarding the data input/output operation from the memory device 150 to the controller 130.

For example, the controller 130 transmits a program command for storing data in a specific page to the memory device 150. If a program operation in response to the program command is successfully performed, the memory device 150 may transmit a response, indicating that the program operation has been successfully completed, to the controller 130. Due to the program operation, a data item is stored at a blank page in an open memory block of the memory device 150, and status data regarding the page may indicate that the data is stored therein. According to an embodiment, the number of valid pages in the corresponding memory block might be changed. When the memory device 150 transmits the status data regarding the corresponding page or the number of valid pages of the corresponding open memory block to the controller based on a command of the controller 130, the operation status checker 196 performs a double check for the program operation based on the received status data. The operation status checker 196 can confirm once again whether the program operation was successfully completed.

According to an embodiment, the controller 130 can compare the status data transmitted from the memory device 150 with a second map item (e.g., a P2L data item for linking a physical address to a logical address) and check whether the program operation for the data item has been performed successfully. After it is double checked that the program operation is successfully performed, the controller 130 may update a first map item (e.g., a L2P data item for linking a logical address to a physical address) based on the second map item.

The controller 130 recognizes that a program operation for storing a data item has succeeded even when the corresponding program operation failed within the memory device 150. Because the program operation has failed in the memory device 150, the status data regarding the corresponding page may indicate that the data item is not stored therein. Or there may be no change in the number of valid pages in the corresponding memory block. When the memory device 150 transmits the status data at the request of the controller 130, the operation status checker 196 can recognize that the program operation has not been successfully performed based on the received status data. In this case, the controller 130 may perform an operation for recovering an error, occurring during the program operation, instead of updating the first map item (e.g., a L2P data item for linking a logical address to a physical address). For example, to recover the error, the controller 130 can perform a re-program operation with the data item in a different page or a different block of the memory device 150.

Through the above-described processes, even if the memory device 150 and the controller 130 in the memory system 110 recognize a result of the data input/output operation differently from each other, the controller 130 may gather operation information such as the status data regarding a memory group within the memory device 150. Based on the operation information, the controller 130 can recheck whether the data input/output operation has succeeded or failed. On the other hand, when the result of the data input/output operation is determined differently based on the response and the status data regarding the data input/output operation, which is transmitted from the memory device 150, the operation status checker 196 can determine operation success or failure based on the status data. That is, the operation status checker 196 may give a higher priority to a determination based on the status data than that based on the response.

Figure 2:
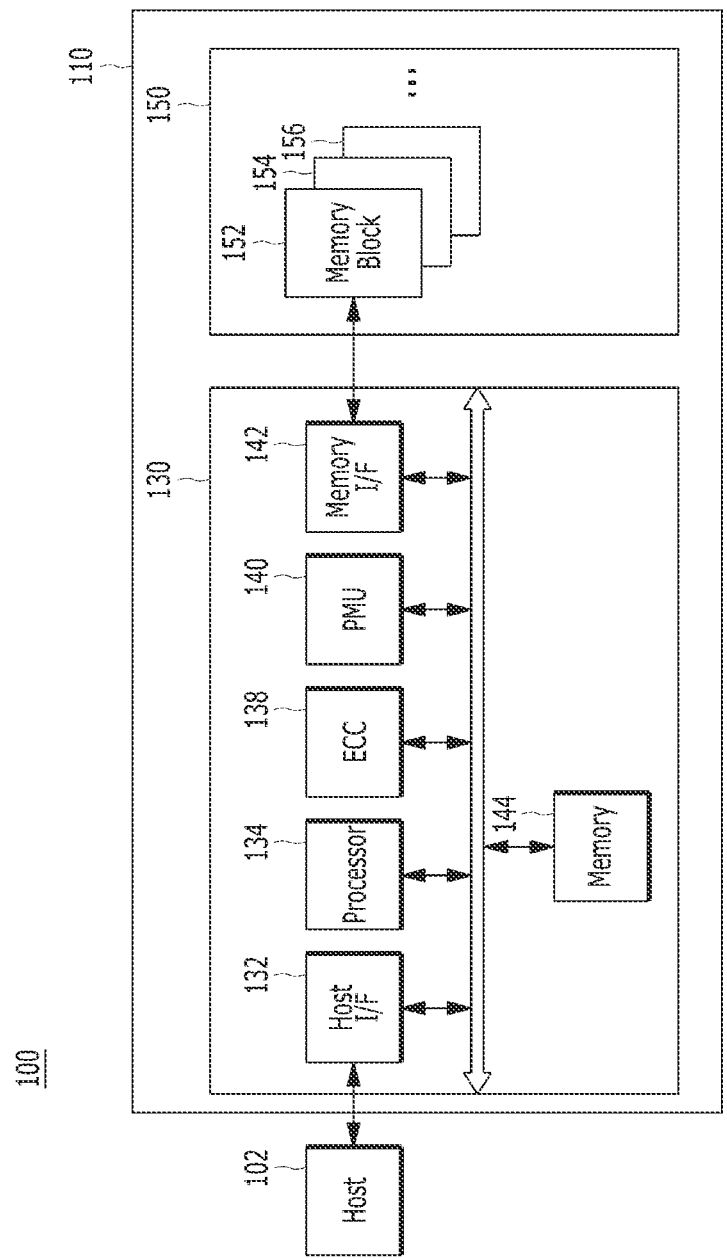
FIG. 2 illustrates a data processing system according to an embodiment of the present disclosure.
Figure 3:
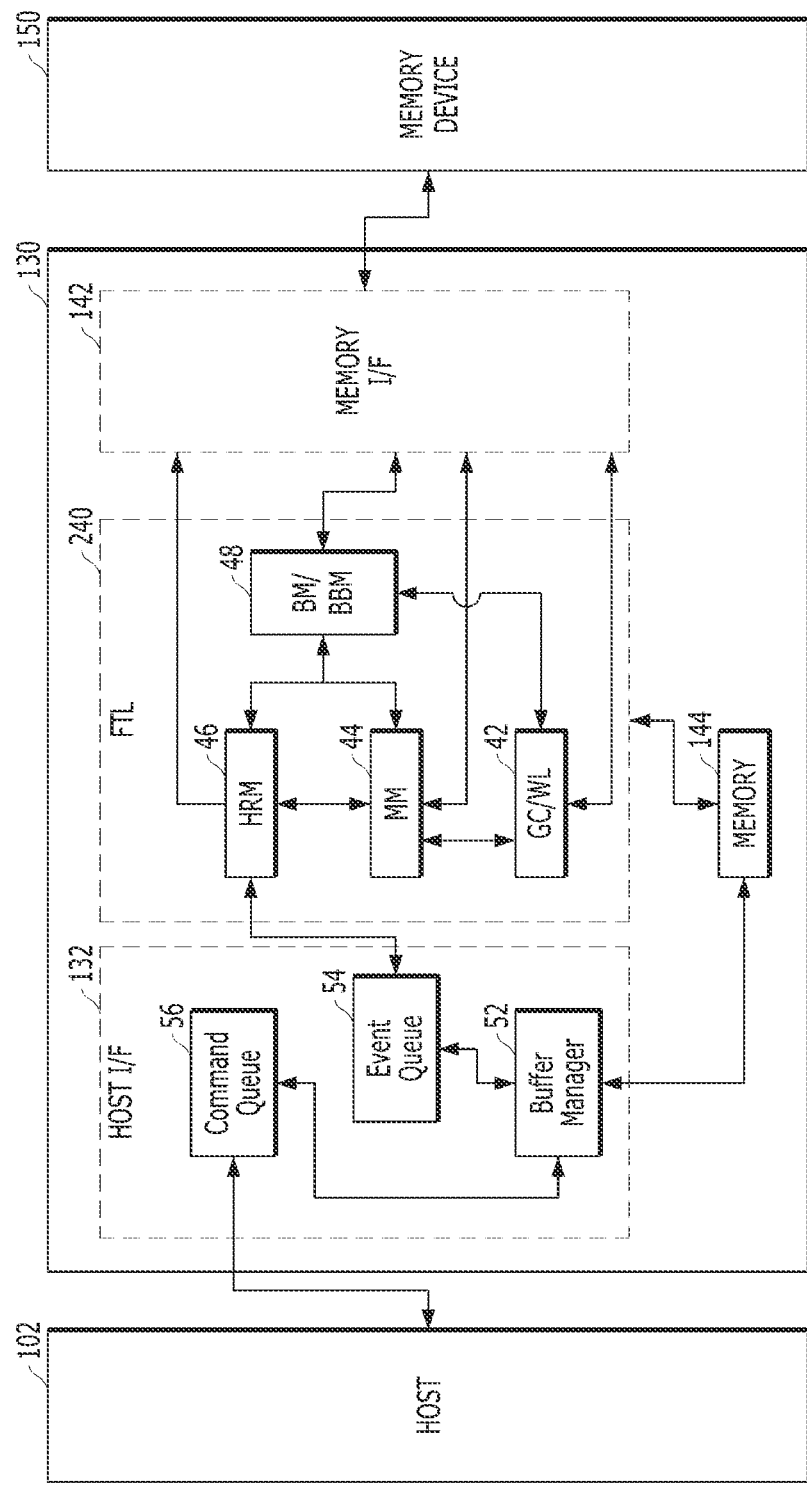
FIG. 3 illustrates a memory system according to an embodiment of the present disclosure.

FIGS. 2 and 3 illustrate some operations that may be performed by the memory system 110 according to one or more embodiments of the present disclosure.

Referring to FIG. 2, a data processing system 100 may include a host 102 engaged or coupled with a memory system, such as memory system 110. The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and the user who intends to store data in the memory system 110. The OS may support functions and operations corresponding to user requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command input from the host 102. For example, the controller 130 may perform a read operation to provide a piece of data read from the memory device 150 for the host 102 and may perform a write operation (or a program operation) to store a piece of data input from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components included in the controller 130 as illustrated in FIG. 2 may vary according structure, function, operation performance, or the like, regarding the memory system 110 among embodiments. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components in the controller 130 may be added or omitted based on implementation of the memory system 110.

The host 102 and the memory system 110 may include a controller or an interface for transmitting and receiving signals, a piece of data, and the like, in accordance with one or more predetermined protocols. For example, the host interface 132 in the memory system 110 may include an apparatus capable of transmitting signals, a piece of data, and the like, to the host 102 or receiving signals, a piece of data, and the like, input from the host 102.

The host interface 132 included in the controller 130 may receive signals, commands (or requests), and/or a piece of data input from the host 102. For example, the host 102 and the memory system 110 may use a predetermined protocol to transmit and receive a piece of data between each other. Examples of protocols or interfaces supported by the host 102 and the memory system 110 for sending and receiving a piece of data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a type of layer for exchanging a piece of data with the host 102 and is implemented with, or driven by, firmware called a host interface layer (HIL).

The Integrated Drive Electronics (IDE) or Advanced Technology Attachment (ATA) may be used as one of the interfaces for transmitting and receiving a piece of data and, for example, may use a cable including 40 wires connected in parallel to support data transmission and reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as the main memory device. The IDE (ATA) may include, for example, Fast-ATA, ATAPI, and Enhanced IDE (EIDE).

Serial Advanced Technology Attachment (SATA) is a type of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for SATA to be transmitted between each other. The SATA has been widely used because of its faster data transmission and reception rate, and its less resource consumption in the host 102 used for data transmission and reception. SATA may support connection with up to 30 external devices to a single transceiver included in the host 102. In addition, SATA can support hot plugging that allows an external device to be attached or detached from the host 102, even while data communication between the host 102 and another device is being executed. Thus, the memory system 110 can be connected or disconnected as an additional device, like a device supported by a Universal Serial Bus (USB) even when the host 102 is powered on. For example, in the host 102 having an eSATA port, the memory system 110 may be freely detached like an external hard disk.

Small Computer System Interface (SCSI) is a type of serial data communication interface used for a connection between a computer, a server, and/or other peripheral devices. The SCSI can provide a high transmission speed, as compared with other interfaces such as IDE and SATA. In SCSI, the host 102 and at least one peripheral device (e.g., memory system 110) are connected in series, but data transmission and reception between the host 102 and each peripheral device may be performed through a parallel data communication. In SCSI, it is easy to connect to, or disconnect from, the host 102 a device such as the memory system 110. SCSI can support connections of 15 other devices to a single transceiver included in host 102.

Serial Attached SCSI (SAS) can be understood as a serial data communication version of the SCSI. In SAS, not only the host 102 and a plurality of peripheral devices are connected in series, but also data transmission and reception between the host 102 and each peripheral device may be performed in a serial data communication scheme. SAS can support a connection between the host 102 and the peripheral device through a serial cable instead of a parallel cable, to easily manage equipment using SAS and enhance or improve operational reliability and communication performance. SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. PCIe can use a slot or a specific cable for connecting the host 102 (e.g., a computing device) and the memory system 110 (e.g., a peripheral device). For example, PCIe can use a plurality of pins (for example, 18 pins, 32 pins, 49 pins, 82 pins, etc.) and at least one wire (e.g., x1, x4, x8, x16, etc.) to achieve high speed data communication over several hundred MB per second (e.g., 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and a peripheral device, such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of the data to be processed in (e.g., output from) the memory device 150, which may include an error correction code (ECC) encoder and an ECC decoder. The ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150. For example, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use a parity bit generated during the ECC encoding process for correcting the error bit of the read data. When the number of the error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include all circuits, modules, systems, and/or devices for performing the error correction operation based on at least one of the above described codes.

For example, the ECC decoder may perform hard decision decoding or soft decision decoding to data transmitted from the memory device 150. The hard decision decoding can be understood as one of two methods broadly classified for error correction. Hard decision decoding may include an operation of correcting an error by reading digital data of '0' or '1' from a non-volatile memory cell in the memory device 150. Because the hard decision decoding handles a binary logic signal, the circuit/algorithm design or configuration may be simpler and processing speed may be faster than soft decision decoding.

Soft decision decoding may quantize a threshold voltage of a non-volatile memory cell in the memory device 150 by two or more quantized values (e.g., multiple bit data, approximate values, an analog value, and the like) in order to correct an error based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like hard decision decoding, and iteratively repeats it through a message exchange in order to improve reliability of the values. Then, the values are finally determined as data of 1 or 0. For example, a decoding algorithm using LDPC codes can be understood as probabilistic decoding. Hard decision decoding is in which the value output from a non-volatile memory cell is coded as 0 or 1. Compared to hard decision decoding, soft decision decoding can determine the value stored in the non-volatile memory cell based on the stochastic information. Regarding bit-flipping (which may be considered an error that can occur in the memory device 150), soft decision decoding may provide improved probability of correcting error and recovering data, as well as provide reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) code for soft decision decoding. The LDPC-CCs code may have a scheme using a linear time encoding and a pipeline decoding based on a variable block length and a shift register.

According to an embodiment, the ECC decoder may use, for example, a Log Likelihood Ratio Turbo Code (LLR-TC) for soft decision decoding. The Log Likelihood Ratio (LLR) may be calculated as a non-linear function for a distance between a sampled value and an ideal value. In addition, Turbo Code (TC) may include a simple code (for example, a Hamming code) in two or three dimensions and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can not only detect power-on or power-off, but also can generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a type of working memory in the memory system 110 or the controller 130, while storing temporary or transactional data which occurred or was delivered for operations in the memory system 110 and the controller 130. For example, the memory 144 may temporarily store read data output from the memory device 150 in response to a request from the host 102, before the read data is output to the host 102. In addition, the controller 130 may temporarily store write data input from the host 102 in the memory 144, before programming the write data in the memory device 150. When the controller 130 controls operations such as data read, data write, data program, data erase, etc., of the memory device 150, a piece of data transmitted or generated between the controller 130 and the memory device 150 of the memory system 110 may be stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include a command queue, a program memory, a data memory, a write buffer/cache, a read buffer/cache, a data buffer/cache, a map buffer/cache, and/or the like. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. According to an embodiment, the processor 134 may be implemented with a microprocessor or a central processing unit (CPU).

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may be independent of a command or a request input from an external device such as the host 102. In one case, an operation performed by the controller 130 in response to the request or the command input from the host 102 may be considered a foreground operation, while an operation performed by the controller 130 independently (e.g., regardless the request or the command input from the host 102) may be considered a background operation. The controller 130 can perform foreground or background operations for read, write or program, erase and the like, regarding a piece of data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or the like. The background operations may be performed in relation to a plurality of memory blocks 152, 154, 156 included in the memory device 150.

According to an embodiment, substantially similar operations may be performed as both the foreground operation and the background operation. For example, when the memory system 110 performs garbage collection in response to a request or a command input from the host 102 (e.g., Manual GC), garbage collection can be considered a foreground operation. When the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 in order to improve performance of the memory system 110. For example, the transmitted requests or commands may be divided and processed in parallel within at least some of a plurality of planes, a plurality of dies or a plurality of chips included in the memory device 150. The memory interface 142 in the controller 130 may be connected to a plurality of planes, dies or chips in the memory device 150 through at least one channel and at least one way. When the controller 130 distributes and stores data in the plurality of dies through each channel or each way in response to requests or a commands associated with a plurality of pages including non-volatile memory cells, plural operations corresponding to the requests or the commands can be performed individually or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize statuses regarding a plurality of channels (or ways) associated with a plurality of memory dies included in the memory device 150. The controller 130 may determine the status of each channel or each way as one of, for example, a busy status, a ready status, an active status, an idle status, a normal status, and/or an abnormal status. The determination of which channel or way an instruction (and/or a data) is delivered through by the controller can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a set format or structure. For instance, the descriptors may include device descriptors, configuration descriptors, unit descriptors, and the like. The controller 130 can refer to, or use, the descriptors to determine which channel(s) or way(s) an instruction or a data is exchanged via.

Referring to FIG. 2, the memory device 150 in the memory system 110 may include the plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together. In one embodiment, each memory block 152, 154, 156 may have a three-dimensional stack structure for high integration. Further, the memory device 150 may include a plurality of dies, each die including a plurality of planes, each plane including the plurality of memory blocks 152, 154, 156. Configuration of the memory device 150 can be different for performance of the memory system 110.

In the memory device 150 shown in FIG. 2, the plurality of memory blocks 152, 154, 156 are included. The plurality of memory blocks 152, 154, 156 can be any of single-level cell (SLC) memory blocks, multi-level cell (MLC) Cell) memory blocks, or the like, according to the number of bits that can be stored or represented in one memory cell. An SLC memory block includes a plurality of pages implemented by memory cells, each storing one bit of data. An SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in view of storage capacity.

In an embodiment, the memory device 150 may be implemented with MLC memory blocks such as a double level cell (DLC) memory block, a triple-level cell (TLC) memory block, a quadruple-level cell (QLC) memory block and a combination thereof. The double-level cell (DLC) memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with a block including a plurality of pages implemented by memory cells, each capable of storing five or more bits of data.

According to an embodiment, the controller 130 may use a multi-level cell (MLC) memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

Further, according to an embodiment, the controller 130 may program pieces of data in a multi-level cell (MLC) a plurality of times without performing an erase operation on a specific MLC memory block included in the memory device 150. Non-volatile memory cells have a feature that does not support data overwrite. However, the controller 130 may use a feature in which a multi-level cell (MLC) may store multi-bit data, in order to program plural pieces of 1-bit data in the MLC a plurality of times. For a MLC overwrite operation, the controller 130 may store the number of program times as separate operation information when a single piece of 1-bit data is programmed in a non-volatile memory cell. According to an embodiment, an operation for uniformly levelling threshold voltages of non-volatile memory cells can be carried out before another piece of data is overwritten in the same non-volatile memory cells.

In an embodiment, the memory device 150 is embodied as a non-volatile memory such as a flash memory, for example, as a NAND flash memory, a NOR flash memory, and the like. In an embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Referring to FIG. 3, a controller 130 in a memory system operates along with the host 102 and the memory device 150. As illustrated, the controller 130 includes a host interface 132, a flash translation layer (FTL) 240, as well as the memory interface 142, and the memory 144 previously identified in connection with FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in, or associated with, the controller 130.

The host interface 132 may be capable of handling commands, data, and the like transmitted from the host 102. By way of example but not limitation, the host interface 132 may include a command queue 56, a buffer manager 52, and an event queue 54. The command queue 56 may sequentially store commands, data, and the like, received from the host 102 and output them to the buffer manager 52, for example, in an order in which they are stored. The buffer manager 52 may classify, manage, or adjust the commands, the data, and the like, which are received from the command queue 56. The event queue 54 may sequentially transmit events for processing the commands, the data, and the like, received from the buffer manager 52.

A plurality of commands or data of the same characteristic (e.g., read or write commands) may be transmitted from the host 102, or plurality of commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what type of internal operation the controller 130 will perform according to the characteristics of commands, data, and the like, which have been entered from the host 102. The host interface 132 can determine a processing order and a priority of commands, data and the like, based at least on their characteristics.

According to characteristics of commands, data, and the like transmitted from the host 102, the buffer manager 52 in the host interface 132 is configured to determine whether the buffer manager should store commands, data, and the like, in the memory 144, or whether the buffer manager should deliver the commands, the data, and the like into the flash translation layer (FTL) 240. The event queue 54 receives events, entered from the buffer manager 52 which are to be internally executed and processed by the memory system 110 or the controller 130 in response to the commands, the data, and the like, transmitted from the host 102, in order to deliver the events into the flash translation layer (FTL) 240 in the order received.

In accordance with an embodiment, the flash translation layer (FTL) 240 illustrated in FIG. 3 may implement a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44, to determine a physical address corresponding to the logical address which is entered with the events. The host request manager (HRM) 46 can send a read request with the physical address to the memory interface 142, to process the read request (handle the events). In an embodiment, the host request manager (HRM) 46 can send a program request (write request) to the block manager 48 to program data to a specific empty page (no data) in the memory device 150, and then can transmit a map update request corresponding to the program request to the map manager (MM) 44, in order to update an item relevant to the programmed data in information of mapping the logical-physical addresses to each other.

The block manager 48 can convert a program request delivered from the host request manager (HRM) 46, the map manager (MM) 44, and/or the state manager 42, into a flash program request used for the memory device 150 in order to manage flash blocks in the memory device 150. To maximize or enhance program or write performance of the memory system 110 (e.g., see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In an embodiment, the block manager 48 can be configured to manage blocks in the memory device 150 according to the number of valid pages, select and erase blocks having no valid pages when a free block is needed, and select a block including the least number of valid pages when it is determined that garbage collection is to be performed. The state manager 42 can perform garbage collection to move the valid data to an empty block and erase the blocks containing the moved valid data so that the block manager 48 may have enough free blocks (empty blocks with no data). When the block manager 48 provides information regarding a block to be erased to the state manager 42, the state manager 42 may check all flash pages of the block to be erased to determine whether each page is valid.

For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process various requests, for example, queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored In the memory device 150.

When garbage collection is performed, the state manager 42 copies valid page(s) Into a free block, and the host request manager (HRM) 46 can program the latest version of the data for the same logical address of the page and currently issue an update request. When the state manager 42 requests the map update in a state in which copying of valid page(s) is not completed normally, the map manager 44 might not perform the mapping table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
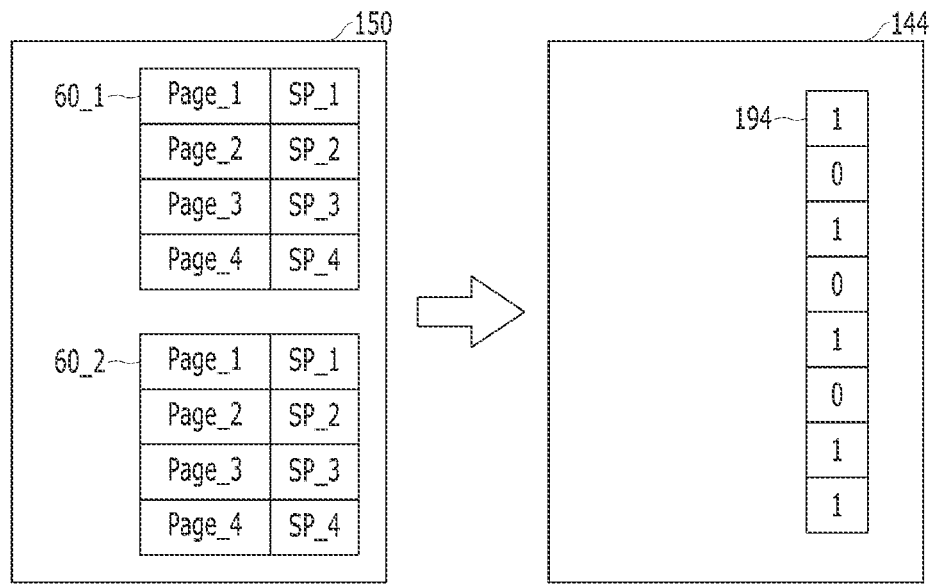
FIG. 4 illustrates an example of bitmap information showing page information in a non-volatile memory device.

FIG. 4 illustrates an example of bitmap information showing page information in a non-volatile memory device. The bitmap information 194 described in FIG. 4 is an example of information that may reflect an operating status regarding a memory group included in the memory device 150 (see FIGS. 1 to 3).

Referring to FIG. 4, the memory device 150 may include a plurality of memory blocks 60_1, 60_2. Each of the memory blocks 60_1, 60_2 can include a plurality of pages. Each page can include a data area Page_1, Page_2, Page_3 or Page_4 for storing a data item, and a spare area SP_1, SP_2, SP_3 or SP_4 for storing status data corresponding to each data area Page_1, Page_2, Page_3 or Page_4. According to an embodiment, the spare area SP_1, SP_2, SP_3 or SP_4 may store metadata. An example of meta data includes bad block information. Further, according to an embodiment, information related to an error correction code can be stored in the spare area SP_1, SP_2, SP_3 or SP_4. The controller 130 and the memory device 150 may use the spare areas SP_1, SP_2, SP_3, SP_4 for storing various types of data.

According to an embodiment, the memory device 150 may generate bitmap information 194 indicating whether data items stored in pages are valid. The controller 130 receiving the bitmap information 194 from the memory device 150 may store and control the bitmap information 194 in the memory 144. For example, if a bit '1' is recorded in the bitmap information 194, it may indicate that a data item stored in a page corresponding to the bit is valid. Here, valid data means that the stored data is the latest data requested by an external device (e.g., host 102), and invalid data means that the stored data is old (already updated with other data). The bitmap information 194 may be used to determine validity of data items stored in the memory device 150 or in other operations such as garbage collection.

In addition, according to an embodiment, the controller 130 may perform a data input/output operation within the memory device 150. The controller 130 may receive status data from the memory device 150 to configure the bitmap information 194. The controller 130 may first determine whether the data input/output operation has succeeded or failed based on a response transmitted from the memory device 150 after sending a command for the data input/output operation to the memory device 150. Thereafter, the controller 130 can request information on operation status from the memory device 150, and the memory device 150 can transmit to the controller 130 the information (e.g., metadata, etc.) stored in the spare areas SP_1, SP_2, SP_3, SP_4. The controller 130 may configure the bitmap information 194 based on the information transmitted from the memory device 150.

The controller 130 can compare the bitmap information 194 and the second map item (e.g., a P2L map item for associating a physical address with a logical address) to determine whether the data input/output operation has been successfully performed. For example, if validity of a data item does not match through the bitmap information 194 and the second map item, the controller 130 can determine that the data input/output operation corresponding to the page has not been successfully performed. When the validity of data is matched through the bitmap information 194 and the second map information, the controller 130 can determine that the data input/output operation has been successfully performed, and then, the controller 130 can update, based on the second map item, the first map item (e.g., a L2P map item for associating a logical address with a physical address).

Figure 5:
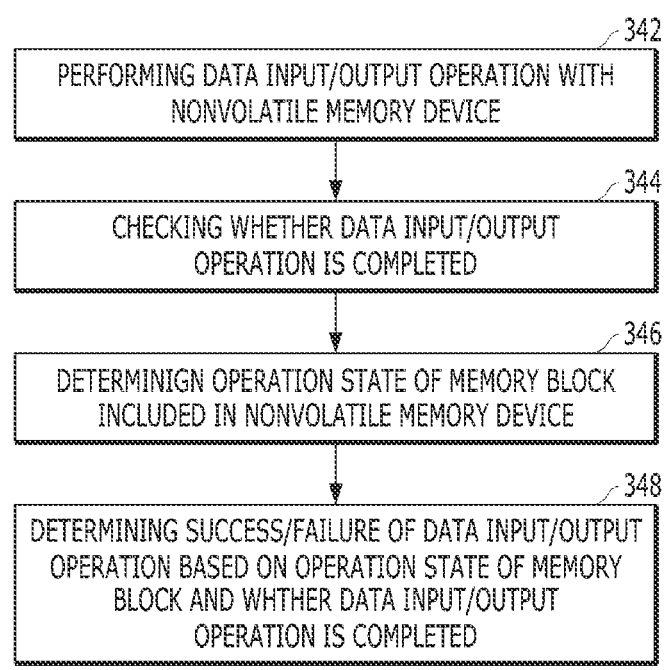
FIG. 5 illustrates a first example of a method for operating a memory system according to an embodiment of the disclosure.

FIG. 5 illustrates a first example of a method for operating a memory system according to an embodiment of the disclosure.

Referring to FIG. 5, the method for operating a memory system can include performing a data input/output operation with a non-volatile memory device (342), checking whether the data input/output operation is completed (344), determining an operation state of a memory block included in the non-volatile memory device (346), and determining success/failure of the data input/output operation based on the operation state of the memory block and a response indicating whether the data input/output operation is completed (348).

Referring to FIGS. 1 to 3, in order to perform a requested operation of an external device (e.g., the host 102) or a background operation, the controller 130 can transmit a command for a data input/output operation to the non-volatile memory device 150. The non-volatile memory device 150 may perform a data input/output operation corresponding to the command input from the controller 130 (342).

The memory device 150 may transmit a result or a response of the data input/output operation to the controller 130, and the controller 1300 may check whether the data input/output operation is completed based on the result or response (344). For example, in response to a program command of the controller 130, the memory device 150 may transmit, to the controller 130, either a success signal indicating that a data item has been programmed or a failure signal indicating that the data item has been not programmed. When the controller 130 sends a read command to the memory device 150, the memory device 150 can transmit, to the controller 130, a data item corresponding to the read command or a failure signal indicating that the read operation has failed.

The controller 130 may request information regarding the operation status of the memory device 150, which is separate from the result or response of the data input/output operation performed within the memory device 150. The controller 130 can generate bitmap information 194 (refer to FIG. 4), based on the information regarding the operation status transmitted from the memory device 150, or obtain page information for the corresponding memory block in the memory device 150 (346). The page information may indicate whether a page is blank or empty or how many pages of a specific block data items are stored in. According to an embodiment, the page information may indicate which of a user data item or a dummy data item is stored in the page.

The controller 130 can check whether the data input/output operation is successfully performed based on not only the result or response indicating whether the data input/output operation is completed but also status data (e.g., page information, memory block information, etc.) of the memory device 150 (348). For example, the controller 130 can compare the operation status of the memory device 150 with the second map item (e.g., a P2L map data item associating a physical address with a logical address), to check again whether a program operation for a specific data item has been successfully performed. After the result or response, indicating whether the data input/output operation is completed, and the operation information or status data of the memory device 150, are transmitted from the memory device 150, a first determination based on the result or response can be different from a second determination based on the operation information or status data. In this case, the controller 130 can assign a higher priority to the second determination based on the status data than the first determination based on the result or response.

According to an embodiment, the controller 130 can generate valid page information which indicates whether a data item stored in a corresponding page is valid. Herein, a valid data item is the most recent data among data items stored in the memory device 150 corresponding to a specific logical address. A valid page is a page storing the valid data item.

Figure 6:
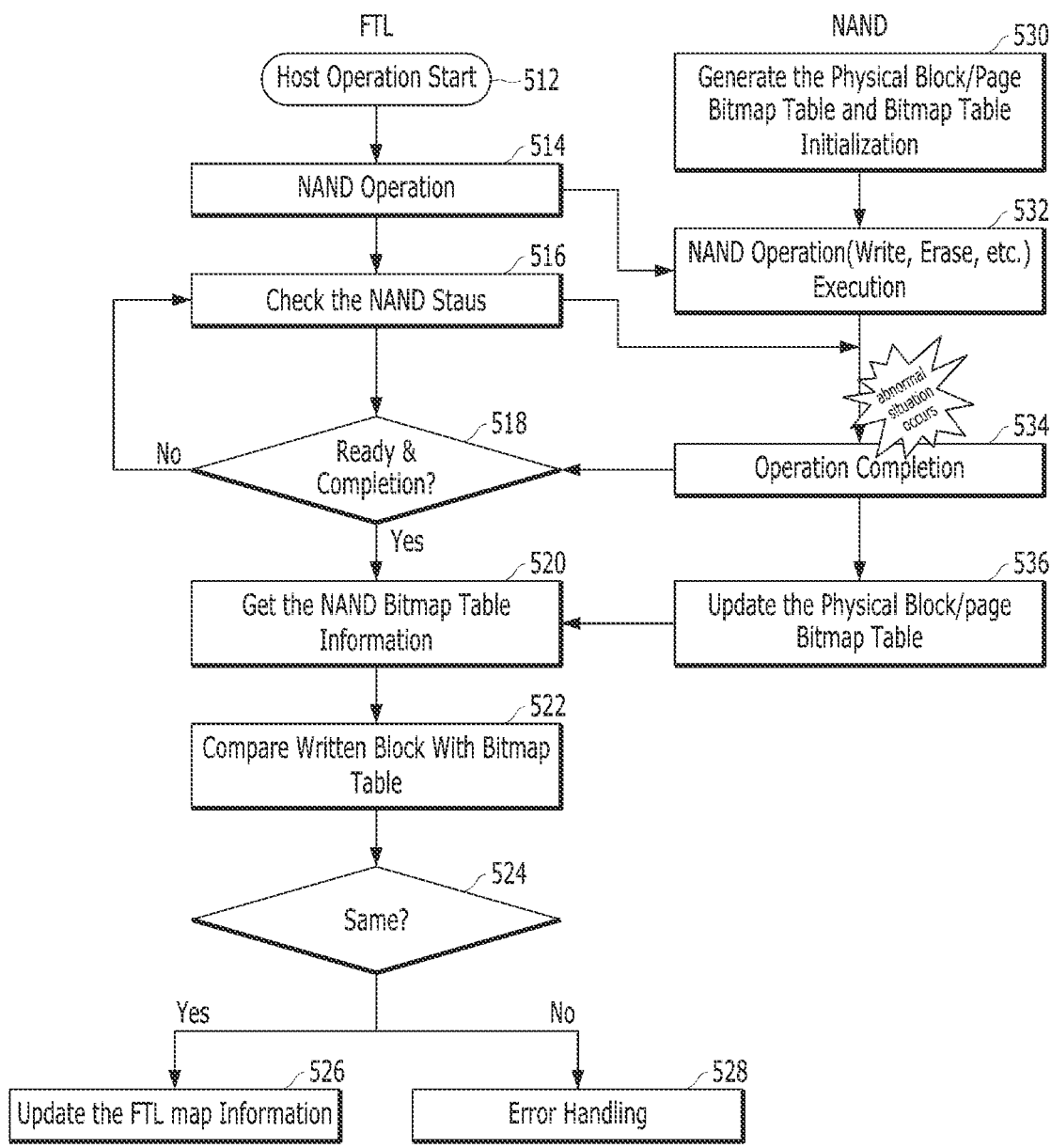
FIG. 6 illustrates a second example of a method for operating a memory system according to an embodiment of the disclosure.

FIG. 6 illustrates a second example of a method for operating a memory system according to an embodiment of the disclosure. Specifically, FIG. 6 describes an example of data communication between the flash translation layer (FTL) 240 (see FIG. 3) and the memory device (NAND) 150 (see FIGS. 1 to 3) in the controller 130 (see FIGS. 1 to 3).

Referring to FIG. 6, the flash translation layer (FTL) 240 may start an operation requested by the host 102 (512). Before performing the operation requested by the host, the memory device 150 may generate information regarding a plurality of memory blocks or pages for bitmap table initialization (530).

The flash translation layer 240 may decode a request of the host 102 and transmit a command to the memory device 150 to perform an operation corresponding to the request (514). The memory device 150 may perform a data input/output operation (e.g., write, erase, etc.) in response to the command transmitted by the flash translation layer 240 (532).

While or after the memory device 150 performs the data input/output operation, the flash translation layer 240 may check a progress of the data input/output operation performed within the memory device 150 (516). In FIG. 6, an abnormal situation has occurred in the process of performing the data input/output operation (e.g., write, erase, etc.) within the memory device 150 in response to the command transmitted from the flash translation layer 240.

In spite of the abnormal situation (e.g., unknown error), the memory device 150 may notify the flash translation layer 240 that the data input/output operation has been completed (534). The flash translation layer 240 can monitor whether the memory device 150 is ready to perform another operation or whether the data input/output operation corresponding to the command is completed (518). When the memory device 150 is not ready for another operation or does not yet complete the data input/output operation corresponding to the transmitted command (NO at the operation 518), the flash translation layer 240 can monitor the data input/output operation performed within the memory device 150 (516).

When the memory device 150 is ready for another operation or has completed the data input/output operation corresponding to the transmitted command (YES in the operation 518), the corresponding memory block where the data input/output operation is performed may be changed and this change may be reflected into a physical block page/page bitmap table. Further, the controller 130 can generate a second map data item (e.g., a P2L map data item associating a physical address with a logical address). For example, when a write operation is performed in a specific memory block, a map data item (e.g., a P2L map data item) for the corresponding memory block may be newly added. Then, the flash translation layer 240 may request bitmap information from the memory device 150 and gather the bitmap information (520). The memory device 150 may update the physical block/page bitmap table, and transmit bitmap information in response to a request from the flash translation layer 240 (536). According to an embodiment, the bitmap information such as the physical block/page bitmap table may be generated by the memory device 150. Or, according to another embodiment, the bitmap information may be generated by the flash translation layer 240 based on information input from the memory device 150.

In addition, according to an embodiment, bitmap information and operation information regarding a memory block may be requested by the flash translation layer 240 and transmitted from the memory device 150 to the flash translation layer 240. In addition, according to an embodiment, when a preset time passes after the data input/output operation is completed within the memory device 150, the memory device 150 can transmit the bitmap information or the operation information regarding the memory block to the flash translation layer 240 even without a request from the flash translation layer 240.

The flash translation layer 240 may compare a change in the corresponding memory block where the data input/output operation is performed with bitmap information (522). According to an embodiment, the change in the corresponding memory block where the data input/output operation is performed may be estimated based on a second map data item (e.g., a P2L map data item associating a physical address with a logical address). For example, when a write operation is performed in a specific memory block, a map data item (e.g., a P2L map data item) for the corresponding memory block may be newly added. If a specific memory block is erased, map data items on the corresponding memory block may be removed. The flash translation layer 240 may compare the change in the corresponding memory block and the bitmap information transmitted from the memory device 150 (522).

The flash translation layer 240 compares the change of the memory block and the bitmap information transmitted from the memory device 150, to check whether the change and the bitmap information regarding the location (e.g., a specific page) where the data input/output operation is performed is the same or different (524). If the change and the bitmap information are the same (YES in the operation 524), the flash translation layer 240 can determine that there is no problem in the data input/output operation performed within the memory device 150, and then the flash translation layer 240 can update a first map data item (e.g., a L2P map data item associating a logical address with a physical address) based on the second map data item (526). If the change and the bitmap information are different (NO in the operation 524), the flash translation layer 240 can determine that there is a problem in the data input/output operation performed within the memory device 150, and then perform a procedure for recovering an error without updating the first map data item (528). To recover the error, the flash translation layer 240 may perform the corresponding data input/output operation again.

For example, in response to a write request transmitted from the host 102, the controller 130 can cause the memory device 150 to perform a program operation corresponding to the write request, and the memory device 150 can transmit a result or response regarding the program operation to the controller 130. The controller 130 can further receive bit map information from the memory device 150. Before updating the first map data item (L2P map data item) based on the second map data item (P2L map data item) in response to the result or response regarding the program operation, the controller 130 can compare the bit map information with the second map data item (P2L map data item). When it is determined that there is no error based on the comparison result, the controller 130 may update the first map data item (L2P map data item) based on the second map data item (P2L map data item). Through these operations, in response to an unexpected error in the memory device 150, the controller 130 may have an opportunity to perform a recovery procedure. According to such a double check procedure, operational reliability of the memory system 110 may be improved or enhanced.

As above described, the memory system according to an embodiment of the disclosure may increase reliability of data input/output operations performed within the non-volatile memory device.

Also, the memory system according to an embodiment of the disclosure may detect or check a malfunction of the non-volatile memory device.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
   a memory device including a plurality of memory groups, each memory group including a plurality of non-volatile memory cells; and
   a controller configured to:
   transmit a command to the memory device so that the memory device performs a data input/output operation within at least one memory group among the plurality of memory groups,
   receive a response which is subject to the command and output from the memory device, the response including a result of an operation that changes data of the at least one memory group performed corresponding to the command, and a status data output from the memory device in response to the operation that changes data of the at least one memory group, the status data including a current operation information, regarding the at least one memory group for which data was changed during the operation that changes data of the at least one memory group,
   compare the status data with a physical to logical (P2L) map data item associated with the data input/output operation to perform a first determination regarding whether the data input/output operation has succeeded or failed,
   perform, based on the response, a second determination regarding whether the data input/output operation has succeeded or failed, determine whether the data input/output operation has succeeded or failed based on both the first determination and the second determination, and update a logical to physical (L2P) map data item based on the P2L map data item according to the first determination and the second determination regarding whether the data input/output operation has succeeded or failed.

2. The memory system according to claim 1, wherein the controller determines whether the data input/output operation has succeeded or failed by assigning a higher priority to the first determination than the second determination, when the first determination and the second determination have different outcomes.

3. The memory system according to claim 1,
wherein each memory group among the plurality of memory groups is a page, and
wherein the status data includes bitmap information indicating whether the page corresponding to the at least one memory group is blank or empty.

4. The memory system according to claim 1,
wherein each memory group among the plurality of memory groups is a memory block, and
wherein the status data includes a valid page count indicating how many pages data items are stored in of the memory block corresponding to the at least one memory group.

5. The memory system according to claim 1, wherein the memory device is configured to:
transmit the response to the controller after the data input/output operation corresponding to the command is completed, and
transmit the status data to the controller when metadata is updated by the data input/output operation.

6. The memory system according to claim 5,
wherein the data input/output operation includes a data program operation or a data erase operation performed within the at least one memory group, and
wherein the memory device is further configured to update the status data according to the data program operation or the data erase operation performed within the at least one memory group.

7. A method for operating a memory system, comprising:
transmitting a command to a memory device for a data input/output operation;
performing the data input/output operation that changes data within at least one memory group in a memory device including a plurality of memory groups, each memory group including a plurality of non-volatile memory cells;
receiving a response, subject to the command and output from the memory device, the response including a result of the data input/output operation;
performing, based on the response, a second determination regarding whether the data input/output operation has succeeded or failed;
receiving a status data, regarding the at least one memory group, output from the memory device in response to the data input/output operation, the status data including a current operation information, regarding the at least one memory group for which data was changed during the data input/output operation;
comparing the status data with a physical to logical (P2L) map data item associated with the data input/output operation to perform a first determination regarding whether the data input/output operation has succeeded or failed;

determining whether the data input/output operation has succeeded or failed based on both the first determination and the second determination; and updating a logical to physical (L2P) map data item based on the P2L map data item according to the first determination and the second determination regarding whether the data input/output operation has succeeded or failed.

8. The method according to claim 7, wherein the determining whether the data input/output operation has succeeded or failed includes assigning a higher priority to the first determination than the second determination, when the first determination and the second determination have different outcomes.

9. The method according to claim 7,
wherein each memory group among the plurality of memory groups is a page, and
wherein the status data includes bitmap information indicating whether the page corresponding to the at least one memory group is blank or empty.

10. The method according to claim 7,
wherein each memory group among the plurality of memory groups is a memory block, and
wherein the status data includes a valid page count indicating how many pages data items are stored in of the memory block corresponding to the at least one memory group.

11. The method according to claim 7, wherein
the status data is transmitted by the memory device after metadata is updated by the data input/output operation.

12. The method according to claim 7,
wherein the data input/output operation includes a data program operation or a data erase operation performed within at least one memory group, and
further comprises updating the status data according to the data program operation or the data erase operation performed within the at least one memory group.

13. A controller coupled via at least one data path to a memory device including a plurality of memory groups, each memory group including a plurality of non-volatile memory cells, wherein the controller comprises at least one processor and at least one memory including computer program code, wherein the at least one memory including the computer program code is configured, with the at least one processor, to cause the controller to:
transmit a command to the memory device for a data input/output operation;
perform the data input/output operation that changes data within at least one memory group in the memory device;
receive a response which is subject to the command and output from the memory device, the response including a result of the data input/output operation;
perform, based on the response, a second determination regarding whether the data input/output operation has succeeded or failed;
receive a status data, regarding the at least one memory group, output from the memory device in response to the data input/output operation, the status data including a current operation information, regarding the at least one memory group for which data was changed during the data input/output operation;
compare the status data with a physical to logical (P2L) map data item associated with the data input/output operation to perform a first determination regarding whether the data input/output operation has succeeded or failed;

determine whether the data input/output operation has succeeded or failed based on both the first determination and the second determination; and update a logical to physical (L2P) map data item based on the P2L map data item according to the first determination and the second determination regarding whether the data input/output operation has succeeded or failed.

14. The controller according to claim 13, wherein the at least one memory including the computer program code is further configured, with the at least one processor, to cause the controller to determine whether the data input/output operation has succeeded or failed by assigning a higher priority to the first determination than the second determination, when the first determination and the second determination have different outcomes.

15. The controller according to claim 13,
wherein each memory group among the plurality of memory groups is a page, and
wherein the status data includes bitmap information indicating whether the page corresponding to the at least one memory group is empty or blank.

16. The controller according to claim 13,
wherein each memory group among the plurality of memory groups is a memory block, and
wherein the status data includes a page count indicating how many pages data items are stored in of the memory block corresponding to the at least one memory group.

17. The controller according to claim 13, wherein the at least one memory including the computer program code is further configured, with the at least one processor, to cause the controller to:
receive the response from the memory device after the data input/output operation is completed, and
receive the status data from the memory device when metadata is updated by the data input/output operation.

* * * * *